3,485,851
PROCESS OF PRODUCING THERAPEUTICALLY VALUABLE ISOVALERIC ACID ESTERS AND PRODUCTS

Peter Willibrord Thies, Hannover, Germany, assignor to Kali-Chemie, Aktiengesellschaft, Hannover, Germany, a corporation of Germany
No Drawing. Filed Apr. 13, 1967, Ser. No. 630,531
Claims priority, application Germany, Apr. 19, 1966, K 59,036
Int. Cl. C07c 7/20
U.S. Cl. 260—345.2      14 Claims

ABSTRACT OF THE DISCLOSURE

An improved process of producing therapeutically valuable isovaleric acid esters $C_{22}H_{30}O_8$, $C_{22}H_{32}O_8$ and $C_{24}H_{32}O_{10}$ from plants of the genera Valeriana and Centranthus comprising adsorbing lipophilic extracts obtained from the roots and/or rhizomes of said plants on activated carbon or silica gel of a particle size between 0.20 and 0.05 mm. and eluting said esters therefrom by means of a lower aliphatic alcohol, preferably of an alcohol with 1–4 C. atoms and/or halogenated hydrocarbons, preferably carbon tetrachloride.

The resulting isovaleric acid esters are highly effective sedative and spasmolytic agents.

---

The present invention relates to an improvement in the process of producing therapeutically valuable isovaleric acid esters and more particularly to a process of producing such esters from roots and/or rhizomes of plants of the genera Valeriana and Centranthus, to products obtained thereby, to pharmaceutical compositions containing same, and to their use in therapy.

It is known to produce valuable isovaleric acid esters which have a sedative and spasmolytic activity, from plants of the genus Valeriana. For instance, there is described in German Patent No. 1,191,515 a process of recovering and isolating the therapeutically valuable isovaleric acid esters from extracts of roots and/or rhizomes of such plants in lipophilic solvents by distribution separation between hydrocarbons and aliphatic carboxylic acids with 2 to 7 carbon atoms. This process is disclosed, for instance, in copending application Ser. No. 339,581, filed Jan. 23, 1964, and entitled "Process Of Producing Esters From Plants of the Genus Valeriana," now U.S. Patent No. 3,422,090, issued Jan. 14, 1969.

According to another known process the valuable isovaleric acid esters obtained thereby are separated and recovered in pure form by chromatography, such as by passing extracts of parts of plants of the genus Valeriana through a column of chromatographic alumina which has been partially inactivated by a treatment with an aliphatic carboxylic acid. Such a process is described for instance, in copending application Ser. No. 385,021 filed July 24, 1964, and entitled "Therapeutically Valuable Isovaleric Acid Ester and Its Isolation," now abandoned.

It is one object of the present invention to simplify the known processes and to provide a simple and effective process of producing the valuable isovaleric acid esters from extracts of plants of the genera Valeriana and Centranthus in a high yield and in the pure state.

Another object of the present invention is to provide valuable isovaleric acid esters of high sedative and spasmolytic activity.

A further object of the present invention is to provide pharmaceutical compositions containing the valuable isovaleric acid esters obtained by carrying out the improved process.

Still another object of the present invention is to provide a method of causing sedation and spasmolytic effects by administering such compositions therapeutically.

Other objects of the present invention and advantageous features thereof will become apparent as the description proceeds.

In principle the improved process according to the present invention comprises the steps of:

(a) Producing a lipophilic extract from the rhizomes and/or roots of plants of the genera Valeriana and Centranthus;

(b) Causing adsorption of such an extract on activated carbon or silica gel of a particle size between 0.2 and 0.05 mm.;

(c) Selectively eluting the sorbed therapeutically valuable isovaleric acid esters from the activated carbon or silica gel by means of a lower alcohol or a halogenated hydrocarbon;

(d) Separating and isolating said isovaleric acid esters from said organic solvent.

This process has many advantages compared with the known processes.

(1) The amount of adsorbing agent required is substantially lower, (2) The control of the eluate fractions is simplified because all undesired compounds of the valeriana plants are contained in the first fractions of the eluate, whereas the residual last fractions contain the three therapeutically valuable isovaleric acid esters, i.e. the control of the eluate is necessary only during the first part of the elution step, because the residual fractions all contain the said valuable compounds and not the undesired accompanying substances. In contrast thereto when using partly inactivated aluminum oxide for chromatography the desired isovaleric acid ester $C_{22}H_{30}O_8$ is contained about in the middle fractions, so that the end point, when the eluate fractions do not contain any more of the valuable ester, must be determined exactly.

Moreover it could not be expected that the three therapeutically valuable isovaleric acid esters could be recovered in the last fractions in pure form when using active carbon or silica gel instead of partly inactivated aluminium oxide as adsorbing agent.

(3) It is a further advantage of the process according to the invention that no pretreatment of the adsorbing agent is necessary.

(4) No prior purification of the lipophilic raw extracts is required.

The production of the lipophilic extracts of rhizomes and/or roots of plants of the genera Valeriana and Centranthus is well known. Fresh extracts obtained as described in the Pharmacopöeia are suitable for the purposes of this invention. It is pointed out that the raw extracts can be used as such and that no prior purification is necessary. In most cases the raw extracts are contracted by evaporation of the solvent and subsequently dissolved in a small amount of a lipophilic solvent before chromatography on activated carbon or silica gel. The preferred extracts are those obtained by extraction with methanol or ethyl /acetate. Other solvents such as hydrocarbons, and halogenated hydrocarbons, such as petroleum ether, methylene chloride, ketones such as acetone, ethers such as tetrahydrofuran, and others can also be used for extraction.

While activated carbon is without effect upon the therapeutically effective isovaleric acid esters, it has been found that silica gel as it is usually employed in chromatography has a decomposing and degrading effect upon the isovaleric acid esters. It has now been found that the silica gel does not cause decomposition and degradation if its particle size is between 0.2 and 0.05 mm.

Adsorption of the isovaleric acid esters of the lipophilic starting extracts on activated carbon or silica gel is effected by placing the concentrated extract dissolved in a lipophilic solvent on the column of the adsorbing agent.

Elution is effected by passing sufficient amounts of a lower aliphatic alcohol with 1-4 carbon atoms or a halogenated hydrocarbon through the activated carbon or silica gel column having adsorbed thereon the active isovaleric acid esters. For the selectivity of the elution it is of course necessary that the column filled with the adsorbing agent has a certain height, so that the eluting solvent passes a certain way through the adsorbing agent. In general a height of at least about 10 cm. of the column filled with the adsorbing agent is necessary per gram of extract.

Preferably elution takes place at room temperature. If the adsorbing agent is of a very small particle size, the elution velocity may be enhanced by passing the solvent under a slight pressure through the column.

Organic solvents which are suitable eluting agents are, for instance, lower alcohols such as methanol, ethanol, propanol, butanol, or halogenated hydrocarbons such as carbon tetrachloride, chloroform, trichloro ethylene. Mixtures of said solvents may also be used.

The following examples serve to illustrate the present invention without, however, limiting the same thereto.

EXAMPLE 1

10 g. of activated carbon are suspended in 50 cc. of methanol. The suspension is filled into a column of a diameter of 20 mm. and a height of 300 mm. 1 g. of a concentrated viscous acetic acid ethyl ester raw extract obtained from the rhizomes of the plant *Valeriana wallichii* D.C. is dissolved in 10 cc. of 95% methanol. The solution is placed on the column and is adsorbed on the activated carbon (Carbonaffin®, sold by the firm Lurgi, West Germany). Thereafter, 500 cc. of 95% methanol are passed through the column under a pressure of 2 atm. gauge. so as to cause desorption. Fractions of 25 cc. of eluate are collected. Thin-layer chromatography shows that the isovaleric acid ester of the empirical formula $C_{22}H_{32}O_8$ is present almost quantitatively in fractions 6 to 20. Said fractions are evaporated to dryness at 30° C. in a vacuum. 0.43 g. of a crystalline product are obtained, i.e. 43% of the total extract adsorbed. On recrystallization from a mixture of ether and petroleum ether (1:9), there are obtained 0.27 g. of the ester of formula $C_{22}H_{32}O_8$ with the melting point of 61° C. The yield is 27% of the starting extract subjected to adsorption and desorption.

EXAMPLE 2

10 g. of activated carbon are suspended in 50 cc. of a mixture of methanol and chloroform (9:1, by volume). The suspension is filled into a column of a diameter of 20 mm. and a height of 300 mm. 1 g. of a concentrated viscous acetic acid ethyl ester raw extract obtained from Radix Valeriana, i.e. the dried rhizomes and roots of *Valeriana officinalis* is dissolved in 10 cc. of a mixture of methanol and chloroform of the same composition. The solution is placed on the column and is adsorbed on the activated carbon. Thereafter, desorption is effected by passing a solvent mixture of the same composition through the column under a pressure of 2 atm. gauge. After collecting only about 100 cc. of the eluate, containing the undesired accompanying substances, the residual fractions containing the isovaleric acid esters of the empirical formula $C_{22}H_{32}O_8$, $C_{22}H_{30}O_8$, and $C_{24}H_{32}O_{10}$ are quantitatively eluted. After concentration in a vacuum 0.472 g. of an oily ester mixture are obtained as residue. Said mixture is dissolved in the double volume of carbon tetrachloride and subjected to chromatographic adsorption on activated carbon. On elution with carbon tetrachloride, as described above there are obtained 0.24 g. of the isovaleric acid ester of the formula $C_{22}H_{32}O_8$ and the melting point of 58° C.

EXAMPLE 3

10 g. of activated carbon are suspended in 50 cc. of ethanol. The suspension is filled into a column. 1 g. of a raw extract obtained by extracting the dried rhizomes and roots of *Valeriana officinalis* is dissolved in the threefold amount by volume of ethanol, placed on the activated carbon column and adsorbed thereon. Elution is effected by passing 95% ethanol under a slight pressure through the column in such a manner that 1 cc. of eluate is obtained per minute. The first 90 cc. of eluate collected contain 0.48 g. of ethereal oils and degradation products of the isovaleric acid esters. On concentration of the following 200 cc. of eluate, there are obtained 0.69 g. of a mixture of about equal parts of isovaleric acid esters of the formulas $C_{22}H_{32}O_8$, $C_{22}H_{30}O_8$, and $C_{24}H_{32}O_{10}$ in the form of a colorless oil.

EXAMPLE 4

10 g. of activated carbon are suspended in 50 cc. of benzine, i.e. a mixture of aliphatic hydrocarbons boiling between 70° C. and 90° C. The suspension is filled into a column of a diameter of 20 mm. and a height of 300 mm. 1 g. of a concentrated viscous acetic acid ethyl ester raw extract obtained from the rhizomes of *Valeriana wallichii* is dissolved in 10 cc. of carbon tetrachloride. The solution is placed on the column and is adsorbed on the activated carbon. Thereafter, desorption is effected by passing carbon tetrachloride through the column under a pressure of 2 atm. gauge. On collecting about 200 cc. of carbon tetrachloride eluate and concentrating the eluate in a vacuum, there are obtained 0.47 g. of a colorless oil which consists of the isovaleric acid esters of the formulas $C_{22}H_{30}O_8$, $C_{22}H_{32}O_8$, and $C_{24}H_{32}O_{10}$ in the proportion of 1:8:1. On recrystallization of said oil from a mixture of ether and petroleum ether (1:9), there are obtained 0.235 g. of the ester of the formula $C_{22}H_{32}O_8$ of the melting point of 59° C.

EXAMPLE 5

25 g. of silica gel (silica gel for chromatography, sold by the firm Merck, West Germany) of a particle size smaller than 0.08 mm. are suspended in 100 cc. of benzine and filled into a column of a diameter of 20 mm. and a height of 300 mm. 2.5 g. of an acetic acid ethyl ester raw extract obtained from the dried rhizomes and roots of *Valeriana officinalis* are diluted with 2.5 cc. of chloroform. Said mixture is placed on the column and is adsorbed on the silica gel. Elution is effected by passing 250 cc. of chloroform at about 2 atm. gauge. The first 20 cc. of eluate collected contain mainly ethereal oils and are discarded. The following 75 cc. of eluate contain the ester of the formula $C_{22}H_{32}O_8$. After concentration of the eluate in a vacuum, a yellow oil is obtained. It is dissolved in a mixture of ether and petroleum ether (1:9) and decolorized by a treatment with charcoal. 0.45 g. of the isovaleric acid ester of the formula $C_{22}H_{32}O_8$ and the melting point of 60° C. are obtained.

Pharmaceutical compositions containing the esters and especially the ester of the formula $C_{22}H_{32}O_8$ are prepared and used therapeutically as described in said aforesaid applications 385,021 and 519,986.

Recent investigations regarding the structure of the compounds of the empirical formulas $C_{22}H_{30}O_8$; $C_{22}H_{32}O_8$; and $C_{24}H_{32}O_{10}$, especially their nuclear magnetic resonance spectrum, confirmed that the basic ring system of said compounds is not a benzofuran ring system but is a cyclopenteno (c) pyran ring system which is isomer to the benzofuran ring system. The new compounds thus correspond to the following structural formula:

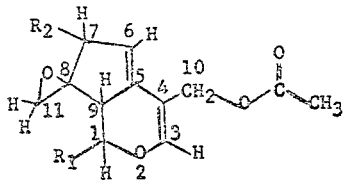

When $R_1$ and $R_2$ represent, each one taken individually, the isovaleroxy group, this formula represents a first ester which has the empirical molecular formula $$C_{22}H_{30}O_8$$

The second ester represented by the formula is the corresponding ester saturated at the shown 5,6-ethylenic unsaturation, resulting in the corresponding 5,6-dihydro ester which has the empirical molecular formula $$C_{22}H_{32}O_8$$

The third ester represented by the formula is the ester in which one of $R_1$ and $R_2$ represents a β acetoxy-isovaleroxy group and the other of $R_1$ and $R_2$ represents an isovaleroxy group; this ester has an empirical molecular formula of $C_{24}H_{32}O_{10}$.

I claim:
1. In a process of producing the therapeutically valuable isovaleric acid esters $C_{22}H_{30}O_8$, $C_{22}H_{32}O_8$, and $C_{24}H_{32}O_{10}$ from plants of the genus Valeriana, the steps which comprise
 (a) causing adsorption of a lipophilic raw extract of roots or rhizomes or both of plants of the genus Valeriana on an adsorbing agent selected from the group consisting of activated carbon and silica gel, said silica gel having a particle size between 0.2 and 0.05 mm.,
 (b) contacting the adsorbing agent having sorbed thereon the isovaleric acid esters with an organic eluting solvent selected from the group of lower aliphatic alcohols and halogenated hydrocarbons to selectively elute said esters from said adsorbing agent.
2. The process according to claim 1, wherein the adsorbing agent is activated carbon.
3. The process according to claim 1, wherein the adsorbing agent is silica gel having said particle size between 0.2 and 0.05 mm.
4. The process according to claim 1, wherein the eluting solvent is a lower alcohol with 1–4 carbon atoms.
5. The process according to claim 4, wherein the eluting solvent is methanol.
6. The process according to claim 4, wherein the eluting solvent is ethanol.
7. The process according to claim 6, wherein the eluting solvent is carbon tetrachloride.
8. The process according to claim 6, wherein the eluting solvent is chloroform.
9. The process according to claim 1, wherein the eluting solvent is a mixture of methanol and chloroform.
10. The process according to claim 1, wherein elution is effected under pressure.
11. The process according to claim 1, wherein the lipophilic starting raw extract is obtained by extracting rhizomes or roots or both of the plants of the genus Valeriana with acetic acid ethyl ester.
12. The process according to claim 1, wherein the lipophilic starting raw extract is obtained by extracting rhizomes or roots or both of the plants of the genus Valeriana with methanol.
13. The process of claim 1 wherein the plant is of the genus Valeriana, species *officinalis* or *wallichii*.
14. The process of claim 1 wherein the eluting solvent is passed through a column filled to a height of at least about 10 cm. of the adsorbing agent per gram of extract.

References Cited

UNITED STATES PATENTS 3,089,877   5/1963   Korte et al. _____ 260—345.2 XR

OTHER REFERENCES

Stoll et al.: Chemical Abstracts, vol. 51, col. 15461 (1957).

Willaman et al.: Economic Botany, vol. 9, pp. 143–144 (1955).

Willaman etl al.: Agricultural Research Service Bulletin ARS-73-1, United States Dept. of Agriculture (May 1955).

NORMA S. MILESTONE, Primary Examiner

J. M. FORD, Assistant Examiner

U.S. Cl. X.R.

260—236.5, 999